Dec. 16, 1969  P. H. JOHNSON ET AL  3,484,200
CARBON BLACK FURNACE AND PROCESS EMPLOYING INSERTABLE RODS
OF CATALYTIC REFRACTORY
Filed June 19, 1967
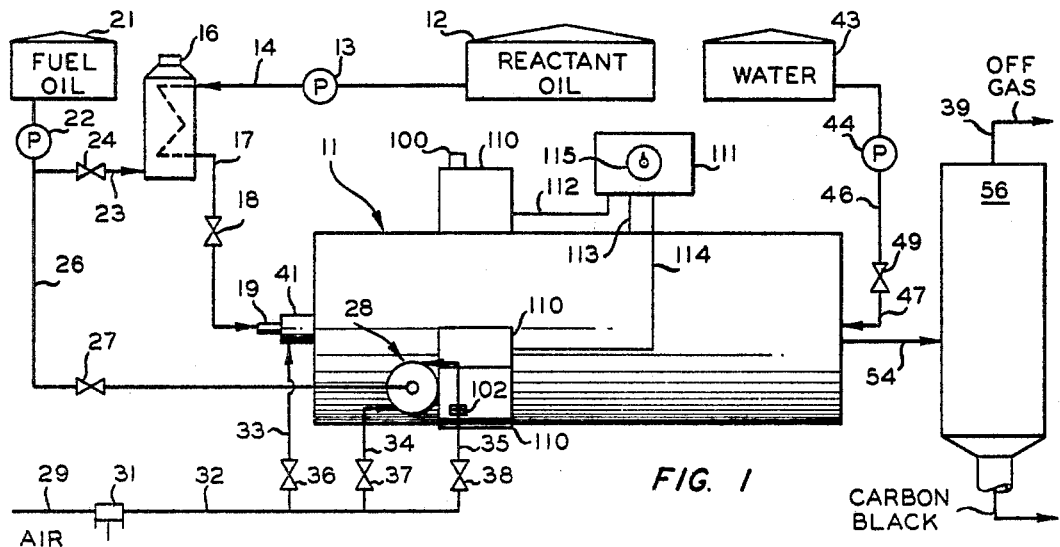
FIG. 1
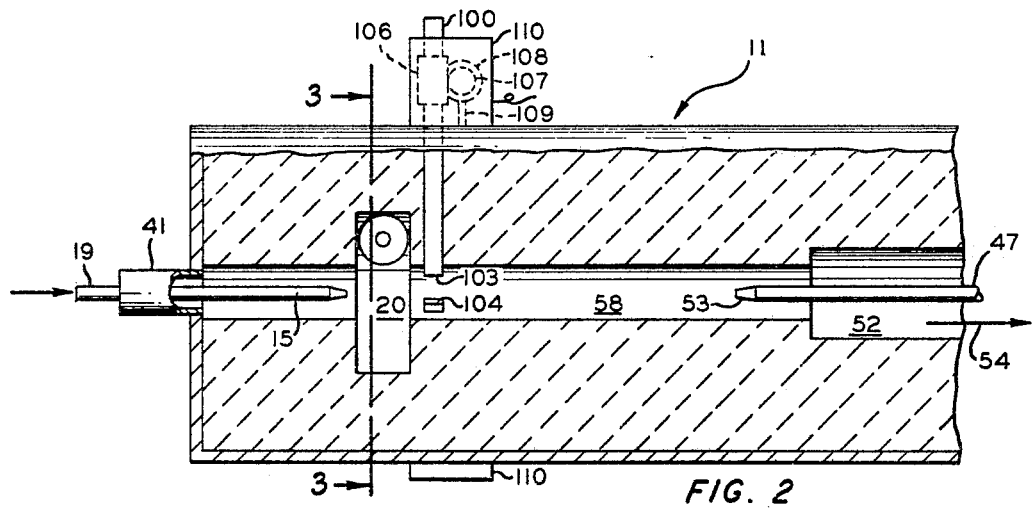
FIG. 2
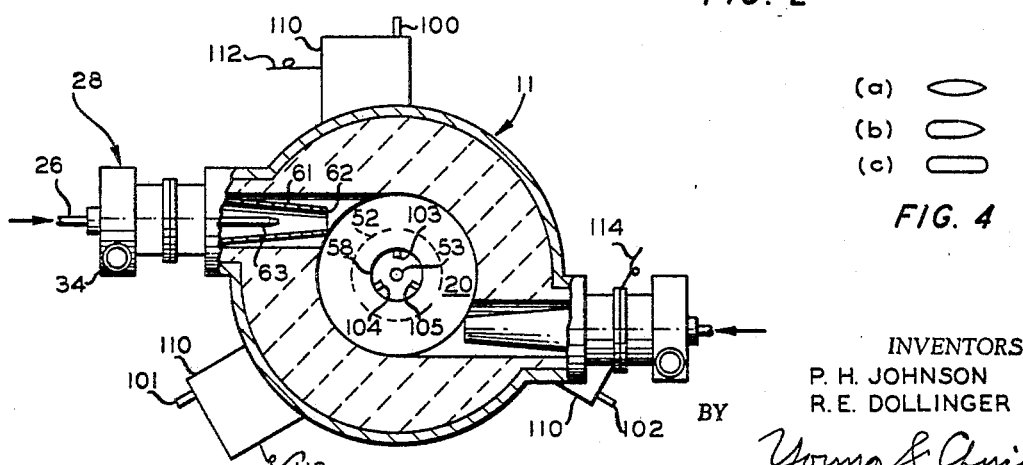
FIG. 3
FIG. 4
INVENTORS
P. H. JOHNSON
R. E. DOLLINGER
BY Young & Quigg
ATTORNEYS

United States Patent Office 3,484,200
Patented Dec. 16, 1969

3,484,200
CARBON BLACK FURNACE AND PROCESS EMPLOYING INSERTABLE RODS OF CATALYTIC REFRACTORY
Paul H. Johnson, Bartlesville, Okla., and Robert E. Dollinger, Phillips, Tex., assignors to Phillips Petroleum Company, a corporation of Delaware
Filed June 19, 1967, Ser. No. 646,884
Int. Cl. C09c 1/50
U.S. Cl. 23—209.5     6 Claims

ABSTRACT OF THE DISCLOSURE

Carbon black furnace and processes of employing the same in which refractory rods constructed in part of an active material comprising an alkali metal, alkaline earth metal, tungsten, thorium, nickel, or platinum compound are moved in and out of the furnace to control the quality of the structure of the carbon black produced due to the catalytic activity of the area of the surfaces of said rods exposed in said furnace.

Field of the invention

This invention relates to carbon black furnaces wherein a hydrocarbon feed is pyrolyzed and cracked by heat and incomplete combustion with a free oxygen-containing gas to form carbon black in a refractory lined furnace. In this field the improvement of the present invention is to form the furnace and operate the same with alkali metal compound-containing refractory rods movable in and out of the furnace to control the quality of the structure of the carbon black produced due to the catalytic area of the surfaces of said rods exposed in said furnace. The field of invention is Class 23, Subclasses 209.1, 209.4, 209.6 and 209.8 for processes and Subclass 259.5 for apparatus as classified by the U.S. Patent Office.

Description of the prior art

U.S. Patents 3,010,794 and 3,010,795 patented Nov. 28, 1961, and corresponding British Patent 886,523, filed July 14, 1959, teach spraying alkali metal compounds into the make hydrocarbon in the reaction zone or chamber of a carbon black furnace to control the quality of the carbon black produced. They do not teach or suggest the present unexpected result of moving refractory rods containing alkali metal compounds in and out of the furnace to control the carbon black structure due to the catalytic area of the surfaces of said rods exposed in said furnace. The present invention does not have to keep adding alkali metal compounds as a consumable reactant, but can continue to use the same refractories containing the same as a catalyst, thus saving a large expenditure of the alkali metal compound. Also, a rapid change can be made in the structure of the carbon black produced without rebuilding the furnace.

Summary of the invention

This invention relates to the insertion of rods constructed of an alkali metal compound- or a tungsten compound-containing material into the combustion chamber of a carbon black furnace so as to control the structure of the carbon black produced in the furnace.

Carbon black is a material produced by the partial combustion of carbonaceous matter and is used in a variety of industrial applications. The wide variety of applications necessarily demands that carbon blacks of different structure be produced. Today there are countless different kinds of carbon blacks produced by a variety of processes and the number of different grades or structures is limited only by the constantly increasing needs and demands of various industrial applications.

The larger part of the carbon black produced today is made by the furnace process and used as a reinforcing agent for rubber. By far the larger part of the compounded rubber material containing carbon black is designed specifically for tire treads or tire carcasses. The state of this rubber compounding art has advanced to such a degree that the properties of the carbon black used in such compounding must be controlled within narrow limits. Such a control of all of the desired properties of the carbon black is oftentimes difficult to achieve.

One of the most important properties of a carbon black when used in the compounding of rubber for use in tire manufacturing is commonly referred to as "structure." There is a close correlation between the structure of a carbon black and the modulus of a rubber product compounded with said carbon black. Other properties being comparable, high structure carbon blacks normally yield high modulus rubber and low structure carbon blacks normally yield low modulus rubber.

By the term "structure," as applied herein to carbon black, is meant characteristics of the carbon black particles which relate to flocculation of said particles. The structure is said to be high when there is a strong tendency for the particles to form chains of particles. Conversely, the structure is said to be low when there is little tendency to form such chains. "High structure" carbon black is generally considered to have a loose black oil absorption of about 1.35 to 1.45 mls./gm. and this is the usual range for prior art furnace blacks. "Normal structure" carbon black is generally considered to have a loose black oil absorption of about 0.75 to 1.2 mls./gm. and in the prior art such blacks have generally been made by the channel black process. "Low structure" carbon black is generally considered to have a loose black oil absorption of about 0.45 to 0.55 ml./gm. and in the prior art such blacks are made by the thermal process. Recently, however, furnace blacks having relatively low structure for blacks made by a furnace process have been marketed. These blacks have, in some instances, proved to be useful in applications formerly served by channel blacks, for example, in reinforcing natural rubber products and in specific applications, for example, in nonsqueal soft-riding tires. These blacks are often designated "low structure" furnace blacks even though their oil absorption values fall in the range for blacks generally designated as "normal" structure or in the range between "normal" and "high" structure because their oil absorption values are lower than normal for blacks made by a furnace process. In this application the term "low structure" means only a carbon black of lower structure than would normally be produced from a given feedstock.

Since it is not convenient to measure the structure directly, the oil absorption of the black is commonly used as a "measure" of the structure. It has been found that the oil absorption of a carbon black correlates closely with certain properties, such as modulus, of a rubber having the carbon black compounded therein. Measurement of oil absorption gives a quick reliable measure of the structure of the carbon black. It is thus possible to obtain a rapid measure of one of the most important properties of carbon black insofar as rubber compounds prepared with said carbon black are concerned.

It is sometimes impossible or extremely difficult to obtain precisely the desired structure on a carbon black product by controlling the furnace conditions without adversely affecting other physical properties and/or the yield of the carbon black. We have now discovered a method of controlling or adjusting the oil absorption or structure of a carbon black product produced in a furnace process which overcomes the above-described difficulties.

In one embodiment, this invention relates to the control of carbon black structure by the insertion of rods of an alkali metal compound- or a tunsten compound-containing material into the combustion chamber of the furnace. In more detail, this invention provides for the control of carbon black structure by inserting or withdrawing at least one rod containing an alkali metal compound or a tungsten compound. Thus, according to this invention, the structure control of carbon black results from the insertion or withdrawal of the rods. In one embodiment, three rods were mechanically linked to an electrically-actuated moving means so as to insert or retract the rods in response to an externally-controlled electrical potential being placed across the moving means.

Accordingly, an object of this invention is to provide valuable carbon blacks and methods of making the same.

Another object of this invention is to provide a process for producing a furnace carbon black having a lowered structure or oil absorption value.

Another object of this invention is to controllably lower or raise the structure or oil absorption of a furnace carbon black produced by the decomposition of a hydrocarbon in a carbon black furnace.

Another object of this invention is to provide a process for making a furnace carbon black, from a given hydrocarbon feedstock, having a lower structure than would normally be produced from said hydrocarbon feedstock.

Another object of this invention is to provide a process for regulating and controlling the properties of furnace carbon blacks so as to satisfy prescribed and predetermined requirements for the properties of measure of the structure of the carbon black.

Another object of this invention is to provide an apparatus which can be employed to produce furnace carbon blacks having decreased or increased structure characteristics.

Still another object of this invention is to control the structure of carbon black by inserting in or withdrawing from the combustion chamber of the carbon black furnace rods containing alkali metal or a tungsten compound.

Other objects, advantages and features of this invention will be readily apparent to those skilled in the art from the following description, drawing and appended claims.

Brief description of the drawings

FIGURE 1 is an elevational view of a carbon black-producing plant including a carbon black furnace embodying the present invention.

FIGURE 2 is an elevational cross-sectional view of the carbon black furnace of FIGURE 1 showing the mechanical movement of the rods.

FIGURE 3 is a cross-sectional view of the furnace of FIGURE 2 taken along the broken line 3—3 looking in the direction indicated, indicating another view of the moveable rods.

Description of the preferred embodiments

Initially, a general description of the operation of a carbon black-producing process will be explained, and subsequently the operation of the invention in the process will be fully explained.

In FIGURES 1, 2 and 3 a carbon black furnace generally designated as 11 is specifically adapted to make carbon black out of reactant carbonaceous materials, for example make oil, preferably such as a gas oil in reactant oil tank 12. The reactant hydrocarbon 12 is preferably pumped by pump 13 through line 14 including vaporizer 16 in which the reactant oil is preferably vaporized. The flow of vaporized oil passes through line 17 controlled by valve 18 to a hydrocarbon injector 19 disposed to discharge a stream of hydrocarbons predominantly axially into a chamber 20 of said furnace 11 via sprayer head 15. In order to heat this axially-moving hydrocarbon so as to convert the same to carbon black by pyrochemical reactions similar to cracking, the reactant fuel from tank 12 is heated in furnace 11 by liquid or gaseous fuel from tank 21. Liquid fuel in tank 21 can be the same material as the gas oil from tank 12 but need not necessarily be of such high grade, and may be any liquid or gaseous fuel, such as cheaper grades of fuel oil. While carbon black can be made with any carbonaceous liquid material as the reactant material in tank 12, it is preferable to use an aromatic concentrate having a typical boiling range of 400–1000° F., a typical Bureau of Mines correlation index in the range of 25 to 150, and a typical API gravity from about 0 to about 20 degree.

The fuel from tank 21 may be pumped by pump 22 through line 23 controlled by valve 24 to heat the vaporizer 16, while some of this fuel may be pumped through line 26 controlled by valve 27 into an oil burner generally designated as 28, wherein it is vaporized and/or burned to provide heat for the pyrochemical cracking type of reaction in chamber 20, which forms carbon black out of the reactant material from tank 12. Vaporizer 16, however, could be heated from a separate source, or unheated, in which case it is not a vaporizer and the oil is merely sprayed into chamber 20 from injector 19, which is provided in that instance with an oil spray nozzle 15.

In order to provide proper heat for the reaction in furnace 11 it is necessary to flow oxygen-containing, generally air, gas into furnace 11 through pipe 29, which may be compressed by compressor 31 and passed through pipes 32, 33, 34 and 35 controlled by valves 36, 37 and 38, as will be described in detail below.

While air is normally the source of oxygen-containing gas, it is sometimes useful, when gas from line 39 is to be used as a synthesis gas for making other synthesized chemicals, to use oxygen or mixtures of oxygen and other gases excluding nitrogen, in place of air in pipe 29.

Generally very little air or oxygen-containing gas is added through line 33, the sole purpose of this line being to reduce carbon deposits on hydrocarbon injector 19 (if necessary) by discharging a small annular stream from surrounding pipe 41. This small supply of oxygen-containing gas may be cut off by closing valve 36 without interrupting the process in many instances permanently or at least over long periods of time. By oxygen-containing gas is meant a gas containing oxygen in a free or a combinable form under the conditions of the reaction in furnace 11.

The reactant material from tank 12 is exposed to the heating effect of liquid fuel burner 28 in furnace 11 and is cracked to form carbon black which passes into the separator 56 in the form of smoke. In order to stop the reaction with a maximum amount of unconsumed carbon black, it is desirable to quench this smoke below 1200 to 1600° F. In one embodiment, water from water tank 43 was pumped through line 46, valve 49 and line 47 by pump 44. The water then sprays from spray head 53, as shown in FIGURE 2, and quenches the furnace products. The water immediately turns to steam after spraying and is removed as a gas along with other gas through line 39. According to one embodiment of this invention, there is a cylindrical chamber 52 larger than chamber 58 down stream from the quenching zone. The quenching feature necessarily results in a large volume of water being introduced into chamber 58. This water is immediately converted to steam and the pressure within chamber 58 is increased accordingly. Chamber 52 is enlarged so as to effect a reduction in this pressure. It is to be understood that any type of quenching feature may be employed in the practice of this invention and the specific embodiment illustrated in the attached figures are not to be limiting. In all events, before gases in 39 or carbon black from 56 are exposed to the atmosphere they should be below the temperature at which they will rapidly combine with oxygen.

The gas and solids separator may comprise the usual types of bag filters, electrical precipitators, cyclone separators or the like, or any combination of the same known to the prior art. The interior of furnace 11 is shown in FIGURE 2, and while it is preferred to use a furnace having an enlarged cylindrical portion 20 of greater diameter than length connected axially to a smaller diameter cylindrical portion 58 of greater length than diameter, valuable commercial results can be obtained in a furnace having a single cylindrical chamber of uniform diameter.

In FIGURES 1 and 2, it will be noted that the carbon black furnace 11 comprises a round furnace chamber 20 (see FIGURE 2), a hydrocarbon injector 19 disposed to discharge a stream of hydrocarbons predominantly axially into said chamber. An oil burner generally designated as 28 is disposed to discharge hot gases into said chamber 20. A cross section of FIGURE 2 is shown in FIGURE 3.

Said oil burner 28 comprises a conical body 61 with an open outlet 62 communicating with said chamber 20 with the longitudinal axis of said body disposed predominantly tangent to the adjacent inner wall of said chamber 20. Said oil burner comprises an oil spray injector generally designated as 63 on oil supply pipe 26. Oil spray injector 63 is disposed to discharge an oil spray of liquid fuel 21 predominantly axially into said body 61, and an air injector 34 is disposed communicating with said body 61 to discharge air into said body predominantly tangent to the adjacent inner wall of body 61. If desired, a plurality of oil burners 28 may be employed and they may have a plurality of air supply pipes 34 and 35. Such duplications of parts are preferable because they have some advantages in stabilizing the conditions of operation of the furnace, but are not necessary to achieve some degree of commercial success.

The present invention applies to any known type of carbon black furnace. However, a preferred furnace is of the general type shown in British Patents 621,031, 679,818 and more preferably 711,816 of Phillips Petroleum Company. As taught in Patent 621,031 the heating of the make hydrocarbon can be with hot combustion gases, or by partial combustion with free oxygen-containing gas, or a mixture of the latter with fuel. While the fuel of these patents can be some of the make hydrocarbon, it is often more economical to use some other cheaper hydrocarbon gas or oil as the fuel, and when fuel is used it conserves the amount of make hydrocarbon that might otherwise be combusted. While the preferred embodiment of this invention employs fuel, the invention is applicable to any process where carbon black is made by pyrolysis of make hydrocarbon by heat.

With respect to the invention, FIGURES 1, 2 and 3 represent one embodiment of the invention being used to control the structure of the carbon black produced by the aforementioned process.

In FIGURES 2 and 3 there are indicated rods 100, 101 and 102. These rods are fitted in passageways extending through the furnace walls and insulation and into the combustion chamber, and as such are adapted to slide so that the end 103, 104 and 105 of the rods can be inserted in or withdrawn from the combustion chamber. In FIGURES 2 and 3 the rod ends 103, 104 and 105 are shown inserted so that they are about half way between the furnace walls and the center of the cylindrical furnace. Of course, the rods can be inserted further in toward the center of the cylindrical furnace or withdrawn back toward the furnace walls. Additionally, the rods can be inserted in any portion of the combustion chamber. Specifically, the rods can be inserted in the larger portion of the combustion chamber upstream from the position shown in the attached drawings. The position of the rods is determined by calibration run data and the method of determining the position will be subsequently explained in detail.

During operation of a furnace employing the invention a carbon black of controlled structure is produced. As has been previously stated, by "low structure" and words of similar import, it is meant that a given carbon black furnace can be made, according to this invention, to produce a carbon black of lower structure than would normally be produced from a given feedstock.

The physical dimensions of the rod can vary with the needs of the user. The rod length can be any length that will allow insertion of the rods to the desired depth in the furnace. The rods can be any size that can be accommodated in the furnace and will produce the desired carbon black structure. The cross section of the rods can be adjusted so that the cross section does not disturb any important flow pattern in the furnace. Although flow patterns are somewhat different in different kinds of furnaces, in all furnaces of the general type illustrated in FIGURES 1, 2 and 3 there is movement of material from the make oil, combustion gas and fuel inlet end of the furnace to the water quench or exit end. In view of this movement of materials, a rod cross section that produces a minimum of friction with the moving matter is highly desirable. In FIGURE 4 there is indicated cross-sectional rod shapes $a$, $b$ and $c$. Although each of these cross sections, as well as other varieties, are applicable for use with this invention, cross section $b$ is used in one embodiment along with the type of furnace illustrated in FIGURES 1, 2 and 3. Cross section $b$ is selected for its particularly friction-free characteristics when high velocity gases are passed around it.

The active component of the rods of this invention may comprise an alkali metal compound, a tungsten compound, a thorium compound, a nickel compound, or a platinum compound-containing material. Additionally, the rods can be constructed from an alkaline earth compound-containing material. Materials which are particularly suitable for use in this invention include thoriated tungsten, cesium oxide-coated tungsten, tungsten coated with other oxides of alkali metals, such as potassium oxide or sodium oxide, or platinum nickel, or nickel alloys coated with silicon oxide or with alkaline earth oxides such as calcium oxide or barium oxide. The concentration of the active component can range from 0.01 weight percent to 15 weight percent, assuming the active component is uniformly distributed in the rods. In one embodiment, rods containing 0.10 weight percent to 5 weight percent active component are used. The material other than the active component can comprise any material that will maintain a solid form and exhibit sufficient internal strength to allow it to be inserted and withdrawn at elevated temperatures of 2000° F. or more. In one embodiment, a commercially available ceramic refractory material is satisfactory for use in this invention, and the active compound can be potassium oxide or sodium oxide.

Because alkali metal compounds are not good refractories and their addition tends to reduce the refractory properties of good refractories to which they are added, it is preferred to have 70 percent or more alumina ($Al_2O_3$) present in the finished refractory to make it react like a mullite and resist the refractory property reducing tendencies of the alkali metal compounds. However, the amounts of alkali metal compounds disclosed in this specification are all useful in the practice of this invention in refractories having less than 20 percent alumina or no alumina at all. The present invention is unexpected, because in the prior art everyone has avoided having any alkali metal compound present in the carbon black furnace refractories because of their known tendency to reduce the refractory properties of the same by fluxing due to heat at relatively low temperatures compared to the other known refractory materials. It has now been found that suitable amounts of alkali metal compounds can be added to carbon black furnace refractories so that they are operative as refractories and also have catalytic surfaces.

According to this invention, the structure of carbon black is controlled by inserting and withdrawing rods in and out of the combustion chamber of the furnace. In FIGURES 2 and 3 there is indicated one embodiment of a means to move the rods in and out of the combustion chamber. In this embodiment, a rod 100 of desirable length, size and cross section is fitted with a metal jacket 106 to which a row of gear teeth is attached. An electrically-powered motor 108 is attached to furnace housing 11 by a motor mount 109. The motor shaft is fitted with a gear 107 whose teeth correspond to the teeth attached to metal jacket 106 and the motor is positioned so that the gear teeth are interlocked so that the movement of the shaft motor 108 will cause rod 100 to be either inserted or withdrawn from the carbon-forming zone. The means to move rod 100 is covered with a housing 110. In this embodiment, rods 101 and 102 are adapted to move in the same manner as described for rod 100. Other means can be employed to move the rods of this invention.

According to this invention any number of movable rods can be used. In one embodiment, three rods are used, as illustrated in FIGURES 1, 2 and 3.

Although this invention has been described as controlling the structure of carbon black produced in the general type of furnace shown in the attached figures, it is to be understood that this invention finds application in any other furnace that produces carbon black by the high temperature partial combustion of a carbonaceous material.

As has been previously explained, this invention controls the structure of carbon black by inserting rods into the combustion chamber of a carbon black furnace. The term "rods" in this application means any solid device that can be inserted and withdrawn from the furnace. Included in this definition would be rods of various shapes and sizes, sheet, plates and shapes of any sort, as long as the devices can be inserted and withdrawn so as to control the structure of the carbon black and without serious interference with gas flows within the reactor.

Although applicants do not desire to be limited to any particular theory of operation, one possible theory of operation, is that the alkali metal compounds react in a catalytic manner on the surface of the rods with the carbonaceous materials of the make oil. Another possible theory is that at elevated temperatures of at least 2000° F. the active materials of this invention emit electrons and the electron emission is responsible for the particular structure of the carbon black.

The functioning of the control system will now be described. Initially, the rods are manufactured, fitted with a means to move the rods, and the structure that is produced by each calibration setting recorded. In the embodiment described in the attached figures, an electric motor is used to insert and withdraw the rods. The motors for each of the three rods are connected to a control box 111 by motor leads 112, 113 and 114. Control box 111 is adapted to receive an input power signal and supply potential to the motors so as to either insert or withdraw the rods in accordance with a manually-made setting on the control box. Although other devices that will actuate motor 108 so as to associate a single position of dial 112 with a single rod position can be used, a Selsyn system is used in one embodiment. A Selsyn system, as is known in the art, consists of a Selsyn generator and at least one other Selsyn motor attached to the Selsyn generator. The Selsyn generator is actually a Selsyn-type motor adapted so that the armature can be manually rotated to a selected position. According to the operation of the Selsyn system, a manually-set armature position on the Selsyn generator will cause the other Selsyn motor attached to the Selsyn generator to assume the same angular armature position.

Thus, dial 112 is attached to the armature shaft of the Selsyn generator so that rotation of dial 112 rotates the Selsyn generator shaft, and hence results in the other three Selsyn motors attached to the Selsyn generator also rotating to the same position. The circuit illustrated on page 317 of Radar System Fundamentals, published by the Navy Department, April 1944, is satisfactory for use in this invention.

Thus, in FIGURE 1, if it is desired to move the rods inward toward the center of the furnace, dial 112 (Selsyn motor shaft) is turned to the "Rods In" position and the Selsyn motor supplies potential to the three attached motors so as to move all three rods as far toward the center of the furnace as they will go which would, of course, be when they were touching in the center. Conversely, if it is desired to withdraw the rods completely from the furnace, dial 112 (Selsyn motor shaft) is turned to the "Rods Out" position and control box 111 supplied potential to withdraw the rods completely from the furnace. Dial 112 is equipped, in one embodiment although not limited thereto, with 10 position adjustment beginning with the "Rods Out" position as 1 and ending with the "Rods In" position as 10. The apparatus is then calibrated by conducting a rod when the rods are in each of the 10 positions. Data are collected indicating the structure produced by each of the 10 positions and these data are correlated with the setting of dial 112 by preparation of the results in tabular or graphical form. Once the dial settings have been correlated with carbon black of known structure produced by a make oil of known character, the operator can set dial 112 to produce any given structure of carbon black that the particular apparatus is capable of producing. It is by this means that the desired structure of carbon black is produced.

This invention is thus broadly applicable to controlling the structure of carbon black by inserting and withdrawing rods containing an active material from the combustion chamber of the carbon black furnace.

The carbon black produced can be more or less continuously analyzed for structure by suitable analysis, such as oil absorption tests, and the results of these tests can be used more or less automatically to control the dial 112 to keep the structure of the carbon black produced more or less constant at a predetermined value.

Various modifications of this invention can be made in view of the foregoing disclosure and the appended claims without departing from the spirit or scope thereof.

Example 1

The furnace and control apparatus, as illustrated in the attached figures, are calibrated by making ten runs with make oil of a known and constant character and determining the structure of the black produced during each run. Each of the ten runs are conducted with the rods in a different position starting with the three rods inserted as far toward the center of the furnace as they will go (position 1) and ending with the three rods withdrawn completely from extending into the furnace cavity (position 10). These ten runs are effected by setting dial 112 in a separate position for each run, i.e. 1 through 10. Representative samples of the carbon black produced during each run are tested to determine the character of the structure. Data as to the character of the structure of the carbon black produced during each run are tabulated, as shown in Table I.

TABLE I

| Run: | Carbon black structure, cc./gm. |
|---|---|
| 1 | 0.58 |
| 2 | 0.69 |
| 3 | 0.81 |
| 4 | 0.93 |
| 5 | 1.04 |
| 6 | 1.15 |
| 7 | 1.27 |
| 8 | 1.38 |
| 9 | 1.50 |
| 10 | 1.61 |

As a result of the calibration runs, it is now possible to correlate a given setting of dial 112 with a given carbon black structure that can be produced by the calibrated furnace using the same make oil as used for calibration.

As an example, if it is desired to produce a carbon black of 1.27 cc./gm. structure, the operator can consult Table I and set dial 112 to a setting of 7.

If more precise control is desired, control box 111 can be constructed to permit dial 112 to be set in an infinite variety of positions between the "Rods In" and "Rods Out" positions rather than in only ten positions, or say 8 or 12 positions. In this embodiment, calibration marks are placed on dial 112, as in the earlier embodiment, but due to the fact that dial 112 can be set in an infinite number of positions, a position of 2.5 or 3.75 could be set on dial 112, as opposed to the other embodiment where only finite digits can be set by dial 112. This embodiment permits control between the digits of the calibration. If, for instance, structure of 1.44 cc./gm. is desired to be produced, the operator can examine Table I and set dial 112 on a setting of 8.5 by estimating the dial setting that will achieve the desired results.

Thus, it is apparent that once the furnace employing the invention is calibrated carbon black of controlled structure can be produced for any particular make oil for which calibration runs have been conducted.

Having described our invention, we claim:

1. A method of controlling the structure of carbon black comprising inserting into a carbon black furnace combustion chamber wherein carbon black is being produced at least one rod constructed in part of an active material comprising an alkali metal or compound thereof, an alkaline earth metal or compound thereof, a tungsten compound, a thorium compound, a nickel compound, or a platinum compound, the depth to which said insertion is effected determining the structure of the carbon black produced.

2. The method of claim 1 wherein the carbon black furnace has a first cylindrical combustion chamber of greater diameter than length and a second cylindrical coaxial combustion chamber of lesser diameter communicating therewith and wherein at least one rod constructed in part of an active material comprising an alkali metal oxide, nitrate, or halide, or a tungsten and thorium-containing compound is inserted in said second combustion chamber, said active materials being in the range of from 0.01 to 15 weight percent of the rods.

3. The method of claim 2 wherein the range of active material is from 0.1 to 5 weight percent of the rods.

4. Apparatus for the production of carbon black comprising:
(a) a carbon black furnace having a generally cylindrical combustion chamber therein and a plurality of passageways through said furnace walls adapted to receive and allow rods inserted in said passageways to be inserted and withdrawn from said combustion chamber;
(b) a hydrocarbon injector disposed to discharge a stream of hydrocarbon generally axially into said chamber;
(c) a free oxygen-containing gas injector disposed to discharge said gas into said chamber;
(d) an effluent gas exit adapted to remove the combustion products away from said chamber;
(e) a plurality of rods, each rod adapted by virtue of length and cross-sectional area to be inserted in said passageways and a portion thereof to extend into the combustion chamber, said rods constructed in part of an active material comprising an alkali metal or compound thereof, an alkaline earth metal or compound thereof, a tungsten compound, a thorium compound, a nickel compound, or a platinum compound, said active material being in the range of from 0.01 to 15 weight percent of the rods; and
(f) a means attached to said rods to insert into or withdraw said rods from said combustion chamber, the increasing depth of insertion of the rods tending to decrease the structure of the carbon black produced and the decreasing depth of insertion due to withdrawing the rods tending to increase the structure of the carbon black produced.

5. The apparatus of claim 4 in which:
(a) said generally cylindrical carbon black furnace has a first cylindrical combustion chamber of greater diameter than length and a second cylindrical coaxial combustion chamber of lesser diameter communicating therewith, said second chamber being of greater length than diameter, said furnace containing a plurality of passageways through said furnace walls adapted to receive and allow rods inserted in said passageways to be inserted and withdrawn from said second cylindrical combustion chamber;
(b) a hydrocarbon injector disposed to discharge a stream of hydrocarbon generally axially into said first combustion chamber;
(c) an oil burner disposed to discharge hot gases into said first chamber predominantly tangentially to the adjacent inner wall of said first chamber;
(d) an air injector disposed to discharge air into said first chamber predominantly tangentially to the adjacent inner wall of said chamber; and
(e) the rods of part (e) of claim 4 constructed in part of an active material comprising an alkali metal oxide or a tungsten and thorium-containing compound, said active material being in the range of from 0.1 to 5 weight percent of the rods.

6. The apparatus of claim 5 in which:
(a) the means attached to said rods to insert into or withdraw said rods from said second combustion chamber comprises:
(1) a Selsyn-type electrical motor mechanically linked to each of said rods by suitable linking means, said motor being adapted to insert or withdraw the rods to which the motor is linked through rotation of said motor armature; and
(2) a Selsyn generator attached to each of said Selsyn motors by suitable wiring so that each of the Selsyn motor armatures will assume the same angular position that has been manually set in the armature of the Selsyn generator and thereby insert or withdraw the rods on response to a manual setting of the Selsyn generator armature in a particular position.

References Cited

UNITED STATES PATENTS

| | | | |
|---|---|---|---|
| 2,800,395 | 7/1957 | Bond | 23—209.5 |
| 3,010,794 | 11/1961 | Friauf et al. | 23—209.4 |
| 3,010,795 | 11/1961 | Friauf et al. | 23—209.4 |
| 3,206,285 | 9/1965 | Johnson | 23—209.4 |
| 3,213,026 | 10/1965 | Jordan et al. | 23—209.4 X |

EDWARD J. MEROS, Primary Examiner

U.S. Cl. X.R.
23—209.4, 209.6, 209.8, 259.5